United States Patent
Cavalotto

(10) Patent No.: US 12,273,133 B2
(45) Date of Patent: Apr. 8, 2025

(54) FREQUENCY MULTIPLIER BASED CAPACITIVE GALVANICALLY ISOLATED COMMUNICATION LINK

(71) Applicant: NXP USA, INC., Austin, TX (US)

(72) Inventor: Daniele Vacca Cavalotto, Valperga (IT)

(73) Assignee: NXP USA, Inc., Austin, TX (US)

( * ) Notice: Subject to any disclaimer, the term of this patent is extended or adjusted under 35 U.S.C. 154(b) by 94 days.

(21) Appl. No.: 18/312,789

(22) Filed: May 5, 2023

(65) Prior Publication Data
US 2024/0372572 A1 Nov. 7, 2024

(51) Int. Cl.
| H04B 1/04 | (2006.01) |
| H04L 25/49 | (2006.01) |
| H04L 27/04 | (2006.01) |

(52) U.S. Cl.
CPC ....... *H04B 1/0475* (2013.01); *H04L 25/4902* (2013.01); *H04L 27/04* (2013.01)

(58) Field of Classification Search
CPC .............. H04B 1/0475; H04L 25/4902; H04L 25/0266; H04L 25/0272; H04L 25/0276; H04L 27/04
See application file for complete search history.

(56) References Cited

U.S. PATENT DOCUMENTS

| 9,698,728 B2 | 4/2017 | Kamath |
| 11,483,181 B1 * | 10/2022 | Nasum Subramanyam ................ H04L 25/0266 |
| 2015/0381219 A1 | 12/2015 | Kramer et al. |
| 2022/0103196 A1 | 3/2022 | Briseno-Vidrios |
| 2022/0311451 A1 * | 9/2022 | Nishikawa ............ H03M 3/344 |
| 2023/0034417 A1 | 2/2023 | Shook et al. |

OTHER PUBLICATIONS

ISO782xLL High-Performance, 8000-VPK Reinforced Isolated Dual-LVDS Buffer, Texas Instruments, Mar. 2016, 40 pages.

\* cited by examiner

*Primary Examiner* — David B Lugo

(57) ABSTRACT

A communication system, including: a first modulator configured to modulate a first periodic signal with a first frequency based upon an input signal; a second modulator configured to modulate a second periodic signal with a second frequency based upon the input signal; an isolated differential channel including isolation capacitors with a first line connected to the first modulator and a second line connected to the second modulator; a mixer configured to mix signals received from the first line and the second line of the differential channel and to produce a mixer output signal; a bandpass filter connected to the mixer configured to filter the mixer output signal; an envelope detector configured to detect an envelope of the filtered mixer output signal; and a detector configured to detect a data signal in the envelope of the filtered mixer output signal and to produce an output signal.

12 Claims, 5 Drawing Sheets

FREQUENCY MULTIPLIER BASED CAPACITIVE GALVANICALLY ISOLATED COMMUNICATION LINK

FIELD OF THE DISCLOSURE

Various exemplary embodiments disclosed herein relate to a frequency multiplier based capacitive GICL (Galvanically Isolated Communication Link).

BACKGROUND

Galvanic isolation includes isolating functional sections of electrical systems to prevent current flow; no direct conduction path is permitted. Information may still be exchanged between the sections by other means, such as capacitive, inductive, radiative, optical, acoustic or mechanical.

Galvanic isolation is used where two or more electric circuits must communicate, but their grounds may be at different potentials or there is a difference in voltage domain. Galvanic isolation is an effective method of breaking ground loops by preventing unwanted current from flowing between two units sharing a ground conductor or residing on the same board.

Isolated gate drivers are widely adopted whenever digital signals (i.e., high frequency transmission channel) or analog signals (i.e., Pulse Width Modulation (PWM) signals) are to be transmitted across isolated domains. Isolated domains are often required or may be mandatory in all systems involving power conversion from AC Mains (110V or 220V AC line).

SUMMARY

A summary of various exemplary embodiments is presented below.

Various embodiments relate to a communication system, including: a first modulator configured to modulate a first periodic signal with a first frequency based upon an input signal; a second modulator configured to modulate a second periodic signal with a second frequency based upon the input signal; an isolated differential channel including isolation capacitors with a first line connected to the first modulator and a second line connected to the second modulator; a mixer configured to mix signals received from the first line and the second line of the differential channel and to produce a mixer output signal; a bandpass filter connected to the mixer configured to filter the mixer output signal; an envelope detector configured to detect an envelope of the filtered mixer output signal; and a detector configured to detect a data signal in the envelope of the filtered mixer output signal and to produce an output signal.

Various embodiments are described, further including: a first high pass filter connected between the first line and the mixer; and a second high pass filter connected between the second line and the mixer.

Various embodiments are described, wherein the mixer output signal includes a first frequency component with a frequency of f1−f2, the mixer output signal includes a second frequency component with a frequency of f1+f2, and the bandpass filter filters out the second frequency component and passes the first frequency component, and f1 is the first frequency and f2 is the second frequency.

Various embodiments are described, wherein the mixer output signal includes a first frequency component with a frequency of f1−f2, the mixer output signal includes a second frequency component with a frequency of f1+f2, and the bandpass filter filters out the first frequency component and passes the second frequency component, and f1 is the first frequency and f2 is the second frequency.

Various embodiments are described, wherein the first modulator uses on-off modulation of the first periodic signal based upon the input signal, and the second modulator uses on-off modulation of the second periodic signal based upon the input signal.

Various embodiments are described, wherein the first modulator uses pulse width modulation of the first periodic signal based upon the input signal, and the second modulator uses pulse width modulation of the second periodic signal based upon the input signal.

Further various embodiments relate to a method of communicating over an isolated differential channel, including: modulating a first periodic signal with a first frequency based upon an input signal; modulating a second periodic signal with a second frequency based upon the input signal; transmitting the modulated first periodic signal on a first line of the isolated differential channel; transmitting the modulated second periodic signal on a second line of the isolated differential channel; mixing the first transmitted modulated signal from the first line and the second transmitted modulated signal from the second line to produce a mixer output signal; bandpass filtering the mixer output signal; detecting an envelope of the filtered mixer output signal; detecting a data signal in the envelope of the filtered mixer output signal; and producing an output signal based upon the detected data signal.

Various embodiments are described, further including: high pass filtering the first transmitted modulated signal from the first line; and high pass filtering the second transmitted modulated signal from the second line.

Various embodiments are described, wherein the mixer output signal includes a first frequency component with a frequency of f1−f2, the mixer output signal includes a second frequency component with a frequency of f1+f2, and the bandpass filtering filters out the second frequency component and passes the first frequency component, and f1 is the first frequency and f2 is the second frequency.

Various embodiments are described, wherein the mixer output signal includes a first frequency component with a frequency of f1−f2, the mixer output signal includes a second frequency component with a frequency of f1+f2, and the bandpass filtering filters out the first frequency component and passes the second frequency component, and f1 is the first frequency and f2 is the second frequency.

Various embodiments are described, wherein modulating the first periodic signal uses on-off modulation of the first periodic signal based upon the input signal, and modulating the second periodic signal uses on-off modulation of the second periodic signal based upon the input signal.

Various embodiments are described, wherein modulating the first periodic signal uses pulse width modulation of the first periodic signal based upon the input signal, and modulating the second periodic signal uses pulse width modulation of the second periodic signal based upon the input signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
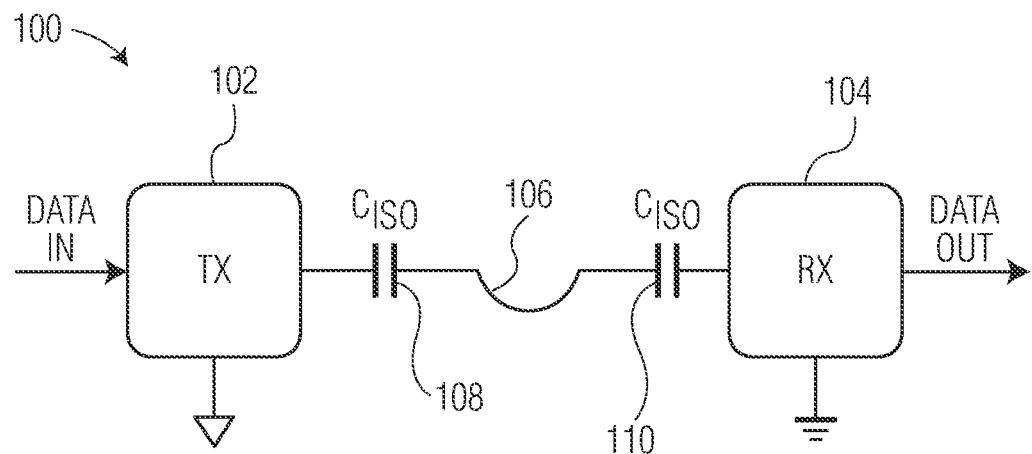
FIG. 1 illustrates the use of isolation capacitors in a single ended channel.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of capacitive GICL (Galvanically Isolated Communication Link) systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Isolated gate drivers and isolated digital transmission channels are widely adopted whenever digital signals (i.e., high frequency transmission channel) or analog signals (i.e., PWM Pulse Width Modulation signals) are transmitted across isolated domains. Isolated domains are often required or mandatory in systems involving power conversion from AC Mains (110V or 220V AC Line). On-Board Chargers (OBC) one potential target application.

Three ways to achieve galvanic isolation include optical coupling, magnetic coupling, and capacitive coupling. Optical coupling provides good performance but has very high cost, high current consumption and poor reliability. Magnetic coupling provides good performance and good common mode rejection but is very expensive. Capacitive coupling results in an inexpensive implementation but is susceptible to common mode signals.

Capacitive coupling galvanic isolation will now be further described. Common Mode Transient Immunity (CMTI) is a key figure of merit and challenge for isolated transmission and isolated gate driver applications. Fast transients between isolated domains reference systems may occur intentionally, (i.e., in case the reference system the switching node of a half bridge, like in isolated gate drivers) or unintentionally (i.e., surge on an AC Line). Common mode transients may be as high as 1500V or 2000V in terms of amplitude and 100V/ns or more in terms of slew rate. The CMTI figure of merit represents the robustness of the system against fast common mode transients. CMTI is hard to achieve in case of capacitive coupling because common mode transients in the range of 1500V. 100V/ns may result is extremely high current injection, and it is hard for the receiver to discriminate among useful signal and spurious CMTI signal.

When a single ended channel is used, the signals are normally in the range of 5V or 3.3V, whereas CMTI may be as high as 1500V/2000V. As a result it becomes very difficult to discriminate between the desired signal and common mode transients. Time filtering is not an option, because CMTI can also be slower than 100V/ns and a fast reaction time (in the range of ns) is often required.

FIG. 1 illustrates the use of isolation capacitors in a single ended channel. The system 100 includes a transmitter Tx 102 and a receiver Rx 104. The Tx 102 and Rx 104 communicate via communication link 106. Isolation capacitors 108 and 110 connected between the Tx 102, the Rx 104, and the communication link 106 provide isolation. The isolation capacitors 108 and 110 may be high voltage capacitors that are made using high voltage insulators (i.e., polyimide). These high voltage capacitors are not very accurate and may have low capacitive value (i.e., tenths of fF) due to high voltage capability. Further, two capacitors in series might be required instead of one to provide redundancy in order to guarantee isolation in case one of the capacitors fails. Also, low input impedance at the receiver Rx 104 is required to maintain proper dynamic range when 1500V or 2000V CMTI happens. This causes strong attenuation and may lead to any useful signal having a small amplitude at the receiver RX 104 (i.e., a few tenths of mV).

Figure 2:
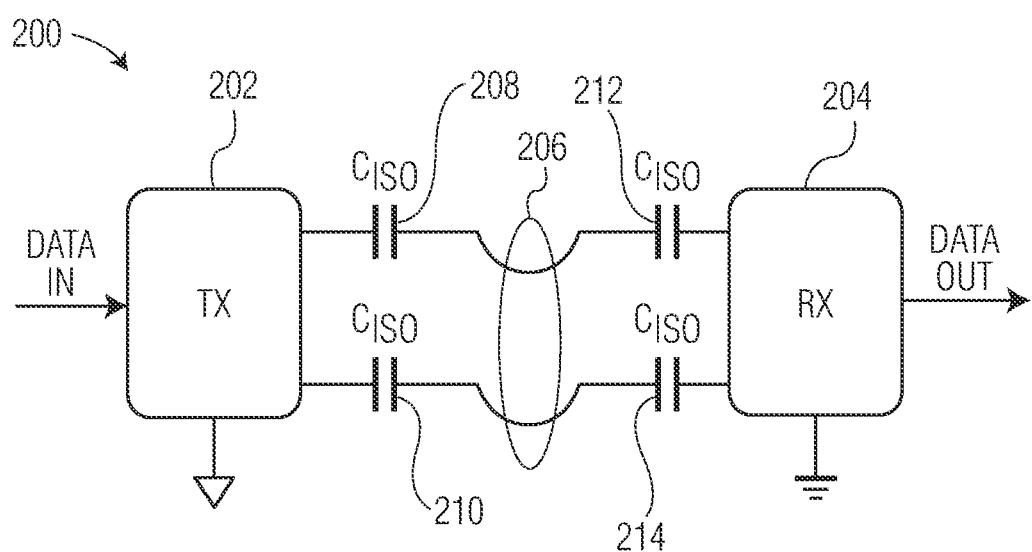
FIG. 2 illustrates the use of isolation capacitors in a differential ended channel.

One solution to overcome these challenges is to use a differential ended channel. FIG. 2 illustrates the use of isolation capacitors in a differential ended channel. The system 200 includes a transmitter Tx 202 and a receiver Rx 204. The Tx 202 and Rx 204 communicate via a differential communication link 206. The differential communication link 206 includes two channels. Isolation capacitors 208, 210, 212, and 214 are connected between the Tx 202, the Rx 204, and the communication link 206 to provide isolation. Mismatch between the two channels of the communication link 206 may occur due to high voltage capacitors manufacturing variances. Hence, in case of mismatch, CMTI may result in a differential signal at RX input, thus leading to a false trigger.

Figure 3:
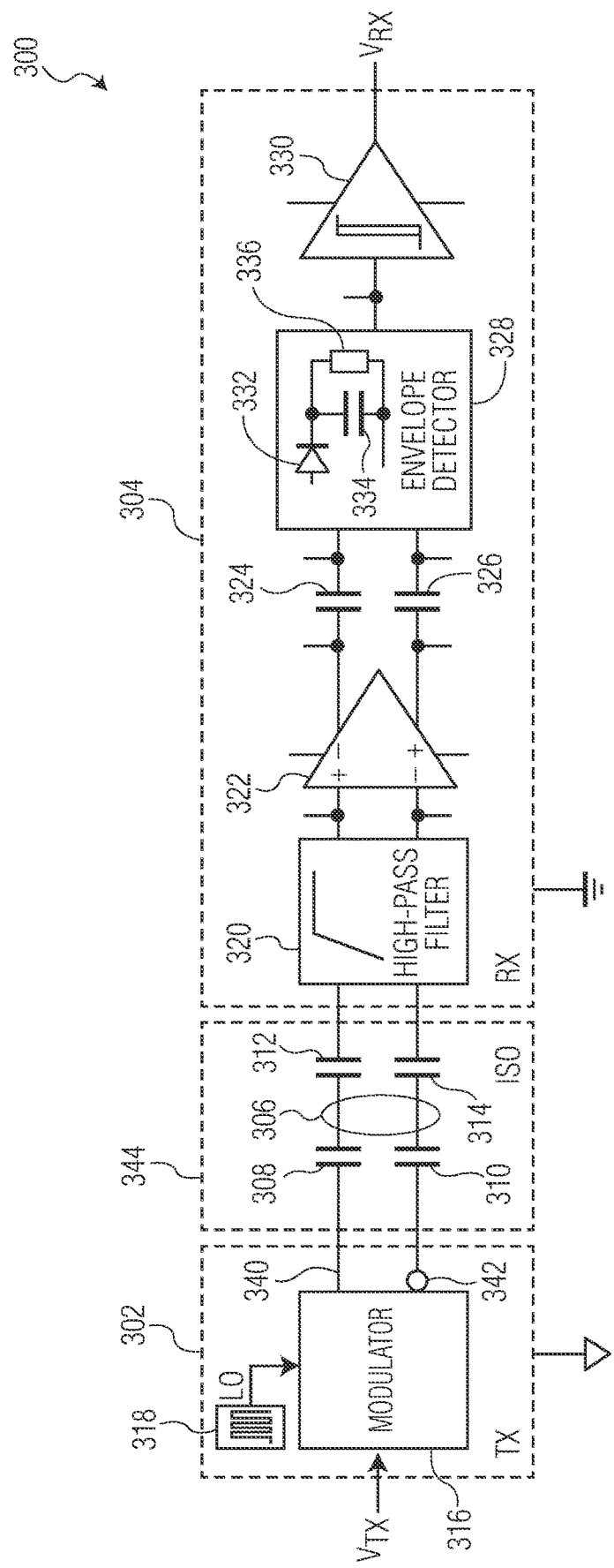
FIG. 3 illustrates a typical implementation of a system using a differential channel.
Figure 4:
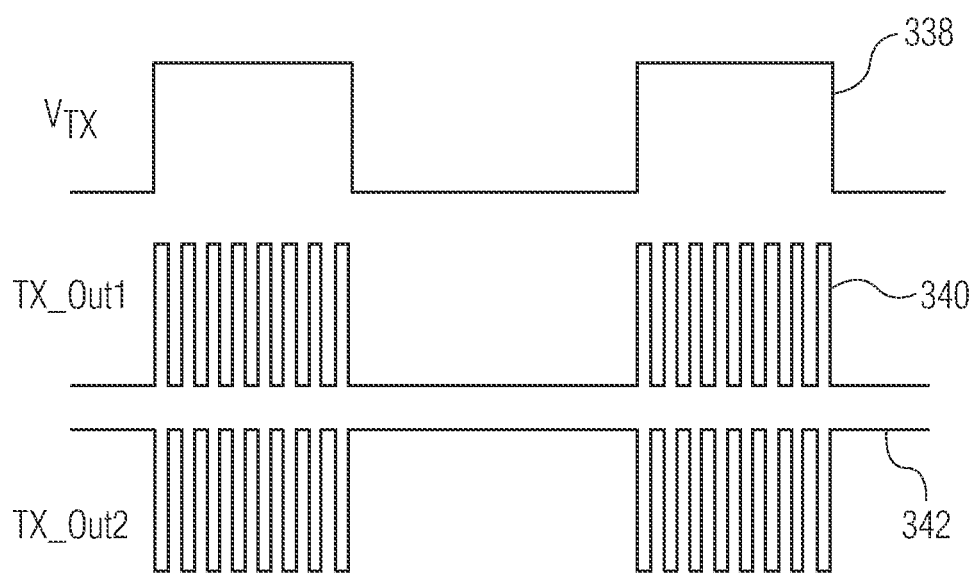
FIG. 4 illustrates the input and output signals from the transmitter TX.

FIG. 3 illustrates a typical implementation of a system 300 using a differential channel. The system includes a transmitter TX 302, isolated channel 344, and receiver RX 304. FIG. 4 illustrates the input and output signals from the transmitter TX 302. The transmitter TX 302 includes a modulator 316 using on-off keying (OOK) (or on-off modulation) and a local oscillator (LO) 318. The LO 318 produces periodic LO signal that is fed into the Modulator 316. The Modulator 316 receives input data VTx 338 and uses VTx 338 to modulate the received periodic LO signal using OOK. The Modulator 316 produces signals TX_Out1 340 and TX_Out2 342. It is noted that TX_Out2 342 is the inverse of TX_Out1 340 resulting in a differential signal outputs. The isolated channel 344 includes communication link 306 including two channels with isolation capacitor 308, isolation capacitor 310, isolation capacitor 312, and isolation capacitor 314. The isolation capacitors 308-314 provide direct current (DC) isolation between the transmitter TX 302 and receiver RX 304.

The receiver RX 304 includes high-pass filter 320, differential amplifier 322, AC coupling capacitor 324, AC coupling capacitor 326, envelope detector 328, and detector 330. The high-pass filter 320 filters out DC and other low frequency components from the differential signal received from the isolated channel 344. The differential amplifier 322 receives and amplifies the filtered differential signal from the differential amplifier 322. Capacitor 324 and capacitor 326 provide some DC blocking on the outputs of the differential amplifier 322. The envelope detector 328 receives the differential signal and detects the envelope of the differential signal. The envelope detector 328 may include a diode 332, capacitor 334, and resistor 336 where the capacitor 334 and resistor 336 are arranged in parallel and then in series with the diode 332. The envelope detector 328 may take on other forms as well. The detector 330 receives the output of the envelope detector 328. The detector 330 detects whether data is present based upon the output of the envelope detector 328. The detector 330 outputs the output signal VRX.

As discussed above, such an implementation works only where there is good matching between isolation capacitors 308-314, which is hard to achieve during manufacturing of the system. Because of this, false triggers may occur which are not acceptable and degrade the performance of the system.

Figure 5:
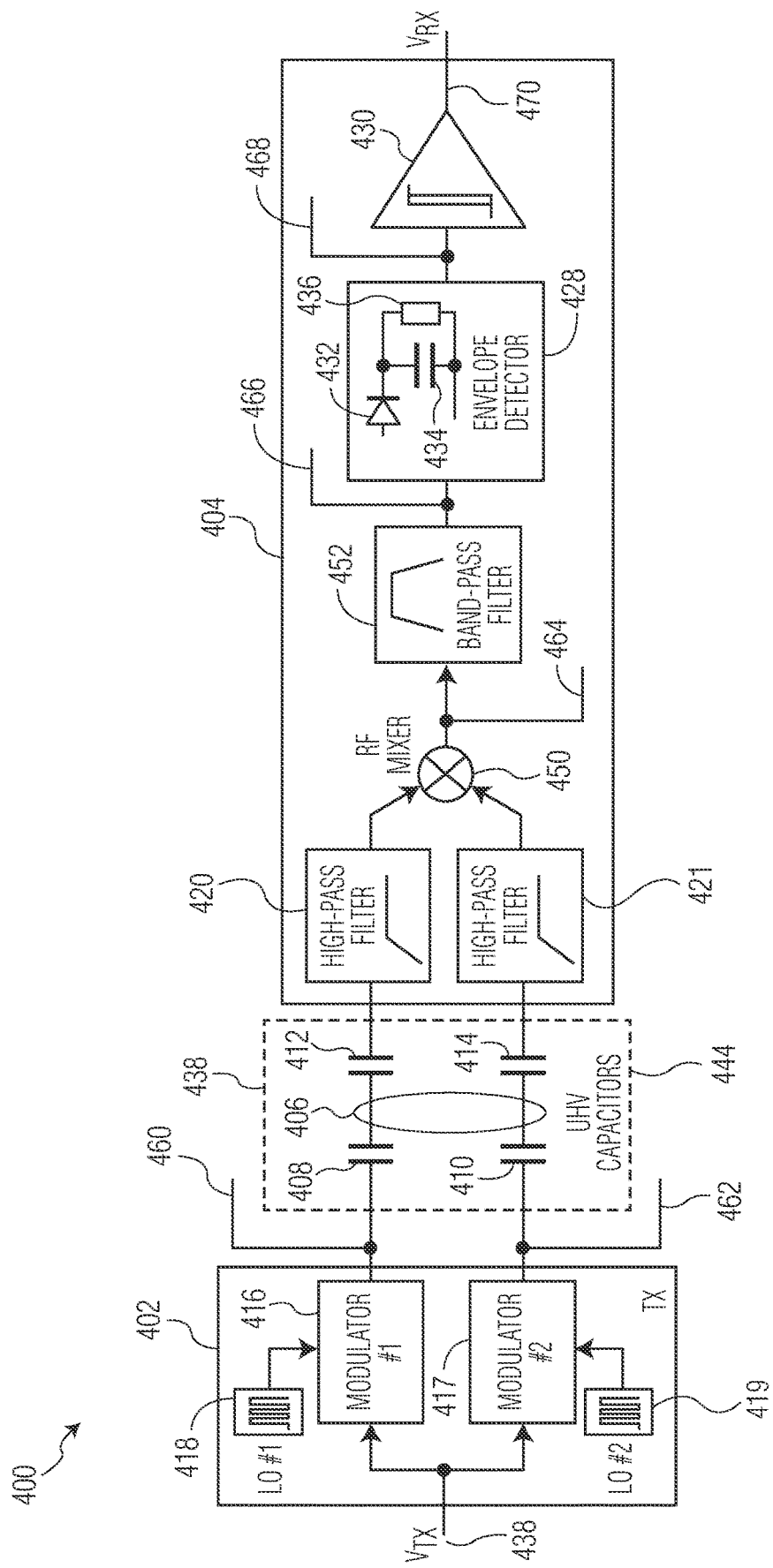
FIG. 5 illustrates a block diagram of a system that allows for improved rejection to common mode transients and allows for easier implementation to overcome the problem of mismatched isolation capacitors.
Figure 6:
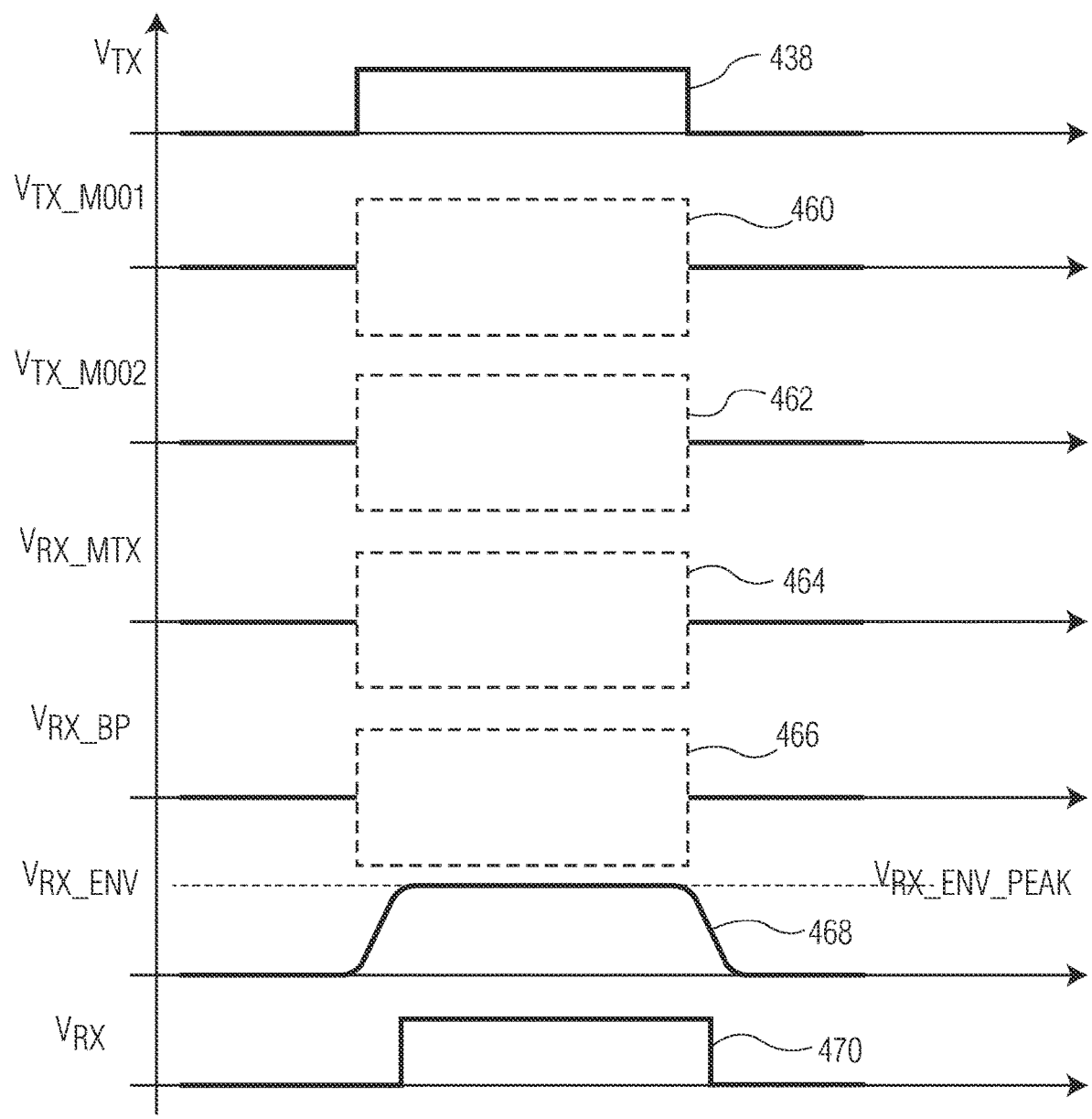
FIG. 6 illustrates the various signals present in the system of FIG. 5.

FIG. 5 illustrates a block diagram of a system that allows for improved rejection to common mode transients and allows for easier implementation to overcome the problem of mismatched isolation capacitors. FIG. 6 illustrates the various signals present in system 400. The system 400 includes transmitter TX 402, isolated channel 444, and receiver RX 404.

The transmitter TX 402 includes Modulator 416, Modulator 417, LO 1 418, and LO 2 419. The LO 1 418 and LO 2 419 produce periodic signals that have different frequencies $f_1$ and $f_2$, respectively. The periodic signals may be sinewaves, square waves, or some other periodic signal. The Modulator 416 receives the input signal VTX 438 and modulates the LO 1 418 using OOK to produce VTX_MOD1 460. The Modulator 417 receives the input signal VTX 438 and modulates the LO 2 419 using OOK to produce VTX_MOD2 462.

The isolated channel 444 is identical to the isolated channel 344 in FIG. 3.

The receiver RX 404 includes high-pass filter 420, high-pass filter 421, RF Mixer 450, band-pass filter 452, envelope detector 428, and detector 430. High-pass filter 420 and high-pass filter 421 filter the differential signal received from the isolated channel 444. The high-pass filter 420 and high-pass filter 421 provide a signal derivative (or second derivative, according to implementation and signal dynamic range in case of common mode disturbances), but $f_1$ and $f_2$ are in its pass band. The RF Mixer 450 multiplies the signals output from the high-pass filter 420 and the high-pass filter 421 to produce VRX_MIX 464. VRX_MIX 464 is a signal with frequency components at $f_1-f_2$ and $f_1+f_2$. The band-pass filter 452 filters VRX_MIX 464 to produce VRX_ENV 466. The band-pass filter 452 will have a pass band that passes $f_1-f_2$ and that rejects $f_1+f_2$. In an alternate embodiment, the band-pass filter 452 may instead pass $f_1+f_2$ and that reject $f_1-f_2$. The envelope detector 428 receives VRX_BP 466 and produces VRX_ENV 468 that is the envelope of the input signal VRX_BP 466. The envelope detector 428 may include diode 432, capacitor 434, and resistor 436 just like the envelope detector 328 described above. The detector 430 receives the output VRX_ENV 468 of the envelope detector 428. The detector 430 detects whether data is present based upon the output of the envelope detector 428. The detector 430 produces the output VRX 470. The detector 430 may detect the rising and/or falling edges of VRX_ENV 468 by comparing it to a threshold value. Other types of detectors may be used as well.

FIG. 6 illustrates plot for VTX 438, VTX_MOD1 460, VTX_MOD2 462, VRX_MIX 464, VRX_BP 466, VRX_ENV 468, and VRX 470. The input signal VTX 438 is the signal to be transmitted over the communication link 406. The signal may be an on-off modulated digital signal or a PWM signal for example. VTX 438 is then used to modulate the signal output by LO 1 418 to produce VTX_MOD1 460. The dotted line in the plot for VTX_MOD1 460 shows the envelope of the modulated LO signal. Likewise, VTX 438 is also used to modulate the signal output by LO 2 419 to produce VTX_MOD2 462. The envelope of VTX_MOD2 462 is also shown as a dotted line. VTX_MOD1 460 and VTX_MOD2 462 are transmitted by isolated channel 444 to the receiver RX 404. High-pass filter 420 receives and filters VTX_MOD1 460. High-pass filter 421 receives and filters VTX_MOD2 462. The RF Mixer 450 multiplies the outputs of high-pass filter 420 and high-pass filter 421 to produce VRX_MIX 464. Again the plot of VRX_MIX 464 shows the envelope of the signal. The band-pass filter 452 filters VRX_MIX 464 to filter out the $f_1+f_2$ component of VRX_MIX 464 while passing the $f_1-f_2$ component to produce VRX_BP 466. It is noted that in alternative embodiments, the band-pass filter 452 filters VRX_MIX 464 to filter out the $f_1-f_2$ component of VRX_MIX 464 while passing the $f_1+f_2$ component. VRX_BPV 466 is then input into the envelope detector 428 to produce VRX_ENV 468. VRX_ENV 468 is then input into the detector 430 to produce VRX 470.

In system 400 there may be a mismatch between isolation capacitors 408, 410, 412, and 414, but this mismatch will not affect the ability of the system 400 to determine if signal was transmitted. The detector 430 is simply looking for the presence or absence of the signal and the amplitude of the signal is not important. Any mismatch of the isolation capacitors will result in a change in the amplitude of the signal that is output from RF Mixer 450, but this does not affect the ability to detect the presence of the signal. In system 300 amplitude is used to detect the presence of a signal, and a mismatch in the isolation capacitors affects this amplitude and hence the ability to properly detect the signal VRX.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having" and/or the like are intended to be open-ended terms. Further, the phrase "based on" is intended to mean "based, at least in part, on" unless explicitly stated otherwise.

The invention claimed is:

1. A communication system, comprising:
   a first modulator configured to modulate a first periodic signal with a first frequency based upon an input signal;
   a second modulator configured to modulate a second periodic signal with a second frequency based upon the input signal;
   an isolated differential channel including isolation capacitors with a first line connected to the first modulator and a second line connected to the second modulator;
   a mixer configured to mix signals received from the first line and the second line of the differential channel and to produce a mixer output signal;
   a bandpass filter connected to the mixer configured to filter the mixer output signal;
   an envelope detector configured to detect an envelope of the filtered mixer output signal; and
   a detector configured to detect a data signal in the envelope of the filtered mixer output signal and to produce an output signal.

2. The communication system of claim 1, further comprising:
   a first high pass filter connected between the first line and the mixer; and
   a second high pass filter connected between the second line and the mixer.

3. The communication system of claim 1, wherein
   the mixer output signal includes a first frequency component with a frequency of $f_1-f_2$,
   the mixer output signal includes a second frequency component with a frequency of $f_1+f_2$, and
   the bandpass filter filters out the second frequency component and passes the first frequency component, and
   $f_1$ is the first frequency and $f_2$ is the second frequency.

4. The communication system of claim 1, wherein
   the mixer output signal includes a first frequency component with a frequency of $f_1-f_2$,
   the mixer output signal includes a second frequency component with a frequency of $f_1+f_2$, and
   the bandpass filter filters out the first frequency component and passes the second frequency component, and
   $f_1$ is the first frequency and $f_2$ is the second frequency.

5. The communication system of claim 1, wherein
the first modulator uses on-off modulation of the first periodic signal based upon the input signal, and
the second modulator uses on-off modulation of the second periodic signal based upon the input signal.

6. The communication system of claim 1, wherein
the first modulator uses pulse width modulation of the first periodic signal based upon the input signal, and
the second modulator uses pulse width modulation of the second periodic signal based upon the input signal.

7. A method of communicating over an isolated differential channel, comprising:
modulating a first periodic signal with a first frequency based upon an input signal;
modulating a second periodic signal with a second frequency based upon the input signal;
transmitting the modulated first periodic signal on a first line of the isolated differential channel;
transmitting the modulated second periodic signal on a second line of the isolated differential channel;
mixing the first transmitted modulated signal from the first line and the second transmitted modulated signal from the second line to produce a mixer output signal;
bandpass filtering the mixer output signal;
detecting an envelope of the filtered mixer output signal;
detecting a data signal in the envelope of the filtered mixer output signal; and
producing an output signal based upon the detected data signal.

8. The method of claim 7, further comprising:
high pass filtering the first transmitted modulated signal from the first line; and
high pass filtering the second transmitted modulated signal from the second line.

9. The method of claim 7, wherein
the mixer output signal includes a first frequency component with a frequency of $f_1-f_2$,
the mixer output signal includes a second frequency component with a frequency of $f_1+f_2$, and
the bandpass filtering filters out the second frequency component and passes the first frequency component, and
$f_1$ is the first frequency and $f_2$ is the second frequency.

10. The method of claim 7, wherein
the mixer output signal includes a first frequency component with a frequency of $f_1-f_2$,
the mixer output signal includes a second frequency component with a frequency of $f_1+f_2$, and
the bandpass filtering filters out the first frequency component and passes the second frequency component, and
$f_1$ is the first frequency and $f_2$ is the second frequency.

11. The method of claim 7, wherein
modulating the first periodic signal uses on-off modulation of the first periodic signal based upon the input signal, and
modulating the second periodic signal uses on-off modulation of the second periodic signal based upon the input signal.

12. The method of claim 7, wherein
modulating the first periodic signal uses pulse width modulation of the first periodic signal based upon the input signal, and
modulating the second periodic signal uses pulse width modulation of the second periodic signal based upon the input signal.

* * * * *